(12) United States Patent
Yamashita

(10) Patent No.: US 9,203,993 B2
(45) Date of Patent: Dec. 1, 2015

(54) DISPLAY SYSTEM AND ELECTRONIC DEVICE

(71) Applicant: Sharp Kabushiki Kaisha, Osaka-shi, Osaka (JP)

(72) Inventor: Tomohito Yamashita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/272,538

(22) Filed: May 8, 2014

(65) Prior Publication Data
US 2014/0362401 A1 Dec. 11, 2014

(30) Foreign Application Priority Data
Jun. 6, 2013 (JP) ................................. 2013-119663

(51) Int. Cl.
 *G06F 3/12* (2006.01)
 *H04N 1/00* (2006.01)
(52) U.S. Cl.
 CPC ....... *H04N 1/00503* (2013.01); *H04N 1/00204* (2013.01); *H04N 1/00411* (2013.01); *H04N 1/00482* (2013.01); *H04N 1/00973* (2013.01); *H04N 2201/006* (2013.01); *H04N 2201/0036* (2013.01); *H04N 2201/0041* (2013.01); *H04N 2201/0055* (2013.01); *H04N 2201/0075* (2013.01); *H04N 2201/0094* (2013.01)
(58) Field of Classification Search
 None
 See application file for complete search history.

(56) References Cited

U.S. PATENT DOCUMENTS

| | | | | |
|---|---|---|---|---|
| 7,864,218 B2* | 1/2011 | Kusaka | ............. | H04N 1/00281 348/207.1 |
| 7,990,556 B2* | 8/2011 | King | ................. | H04N 1/00244 358/1.15 |
| 8,179,563 B2* | 5/2012 | King | ..................... | G06F 17/277 358/1.6 |
| 2008/0165153 A1* | 7/2008 | Platzer | ................. | G06F 1/1626 345/173 |
| 2008/0278437 A1* | 11/2008 | Barrus | ............... | H04N 1/00204 345/156 |
| 2012/0317480 A1* | 12/2012 | Onishi | ............... | H04N 1/00344 715/273 |
| 2013/0077117 A1* | 3/2013 | Kobayashi | ......... | H04N 1/00408 358/1.13 |
| 2014/0240763 A1* | 8/2014 | Urakawa | ............... | G06F 3/1292 358/1.15 |

FOREIGN PATENT DOCUMENTS

| | | | | |
|---|---|---|---|---|
| JP | 2003-198767 A | | 7/2003 | |
| JP | 2003198767 A | * | 7/2003 | ............... H04N 1/00 |
| JP | 2010-49600 A | | 3/2010 | |
| JP | 2010-219879 A | | 9/2010 | |
| JP | 2010219879 A | * | 9/2010 | ............ H04M 11/00 |
| JP | 2012-257132 A | | 12/2012 | |

* cited by examiner

*Primary Examiner* — Marcus T Riley
(74) *Attorney, Agent, or Firm* — Keating & Bennett, LLP

(57) ABSTRACT

A display system includes an image forming apparatus, and a tablet terminal transmitting/receiving information to/from image forming apparatus through wireless communication. The Image forming apparatus detects the tablet terminal, and establishes wireless communication with the detected tablet terminal through a wireless communication driver. When wireless communication is established, the image forming apparatus transmits a display request requesting display of operation information (operation manual) related to the currently ongoing operation, to the tablet terminal. Receiving the display request transmitted from the image forming apparatus, the tablet terminal displays the requested operation information (manual) of the operation manual.

11 Claims, 9 Drawing Sheets

DISPLAY SYSTEM AND ELECTRONIC DEVICE

CROSS-REFERENCE TO RELATED APPLICATION

This nonprovisional application claims priority under 35 U.S.C. §119(a) on Patent Application No. 2013-119663 filed in Japan on Jun. 6, 2013, the entire contents of which are hereby incorporated by reference.

BACKGROUND OF THE INVENTION

1. Field of the Invention

The present invention relates to a display system and an electronic device included in the display system and, more specifically, to a technique for displaying an operation manual of the electronic device.

2. Description of the Background Art

Recently, digital multifunctional peripherals integrally having a plurality of functions such as copy function, printer function and FAX function are installed in many offices and places of business. Typically, a paper-based operation manual (instruction booklet) is attached to an electronic device such as the digital multifunctional peripheral. In these days, electronic devices come to have many functions and accordingly, the number of pages of the operation manuals is increasing. As a result, the cost for printing the operation manuals increased, and the cost of printing comes to be a burden on manufacturers. In order to reduce printing cost, for recent digital multifunctional peripherals, operation manuals based on electronic database (E-manual) come to be commonly used.

By way of example, Japanese Patent Laying-Open No. 2003-198767 (hereinafter referred to as '767 Reference) discloses a digital copy machine using such a manual based on electronic database. The digital copy machine according to '767 Reference has the service manual stored in a hard disk, and the service manual can be updated by a service person.

In an apparatus such as a digital multifunctional peripheral in which an operation panel is provided as a dedicated user interface (hereinafter, user interface will be denoted as "UI"), when the operation manual is displayed on the UI screen (display device), the operation manual fully occupies the UI screen. Therefore, operation while viewing the manual is difficult. Further, in a conventional digital multifunctional peripheral, in order to display that portion of the manual which corresponds to the operation the user is currently doing, a desired piece of information must be searched out from descriptions related to many functions, and at that time, for example, a number of click operations are necessary. Such a procedure requires time and effort. The digital copy machine described in '767 Reference also has the same problem.

As a solution to such a problem, Japanese Patent Laying-Open No. 2010-219879 (hereinafter referred to as '879 Reference) discloses a help information providing system for displaying help information in accordance with a state of digital multifunctional peripheral on a portable telephone. The help information providing system according to '879 Reference includes a digital multifunctional peripheral, a help server providing the help information for the digital multifunctional peripheral, and a portable telephone for displaying the help information provided by the help server. The digital multifunctional peripheral, the help server and the portable telephone are connected to a network. The digital multifunctional peripheral transmits its own device ID and a state code to the help server. The portable telephone extracts a marker image attached to the digital multifunctional peripheral from a photo image data picked-up for the digital multifunctional peripheral, obtains the device ID and a surface code of the digital multifunctional peripheral from the marker image, and transmits the obtained ID and code to the help server. Based on the device ID and the state code transmitted from the digital multifunctional peripheral and on the device ID and the surface code transmitted from the portable telephone, the help server transmits help information corresponding to the state of digital multifunctional peripheral to the portable telephone. Further, the portable telephone combines the help information transmitted from the help server with the photo image data to generate and display image data for providing help information.

In the help information providing system according to '879 Reference, in order to display the help information corresponding to the state of digital multifunctional peripheral on the portable telephone, it is necessary to extract a marker image attached to the digital multifunctional peripheral from the photo image data of the digital multifunctional peripheral, to obtain the device ID and the surface code of the digital multifunctional peripheral from the marker image, and to transmit these to the help server. Therefore, the operation for displaying the help information on the portable telephone requires much time and effort.

SUMMARY OF THE INVENTION

Therefore, it is desirable to provide a display system and an electronic device allowing operation of the device while viewing its operation manual.

According to a first aspect, the present invention provides a display system, including an electronic device and a terminal device transmitting/receiving information to/from the electronic device through wireless communication. In the display system, the electronic device includes: a communication unit conducting wireless communication with the terminal device; a receiving unit receiving an operation by a user; an establishing unit, detecting the terminal device and establishing wireless communication with the detected terminal device through the communication unit; and a transmission unit, responsive to establishment of wireless communication by the establishing unit, for transmitting, through the communication unit, a display request for displaying operation information related to the operation received by the receiving unit of an operation manual of the electronic device itself to the terminal device. The terminal device includes: a display portion displaying the operation manual; a wireless communication unit conducting wireless communication with the electronic device; and a display control unit, responsive to reception of the display request transmitted from the electronic device through the wireless communication unit, for controlling the display portion such that the requested operation information of the operation manual is displayed.

The electronic device establishes wireless communication with the detected terminal device. When wireless communication is established, the electronic device transmits to the terminal device a request for displaying operation information related to the operation received by the receiving unit, of the operation manual. Upon reception of the display request transmitted from the electronic device, the terminal device displays the requested operation information of the operation manual.

In this manner, in the present display system, when the electronic device detects a terminal device and establishes wireless communication, the operation manual is displayed on the terminal device with which the wireless communication has been established. Since the operation manual is displayed on the terminal device in response to establishment of wireless communication, troublesome operation is unnecessary when the operation manual is to be displayed on the terminal device. Since the operation manual of electronic device is displayed on the terminal device as an external device, it is possible to operate the electronic device while viewing the operation manual. Further, since operation information related to the currently on-going operation received by the receiving unit is displayed on the terminal device, it is unnecessary to search a desired piece of information from descriptions of many functions. Therefore, the time and effort to find the target portion of the manual (operation information) can be saved.

Preferably, the establishing unit includes a unit, detecting, when the terminal device is waved over the electronic device, the terminal device and for establishing wireless communication with the detected terminal device through the communication unit. Since wireless communication between the electronic device and the terminal device is established by waving the terminal device over the electronic device, the desired portion of the manual (operation information) of the electronic device can more easily be displayed on the terminal device.

More preferably, the receiving unit includes a display unit displaying an operation screen image for receiving an operation by a user; and the display control unit includes a unit for controlling the display portion such that operation information of the operation manual corresponding to the operation screen image displayed on the display unit is displayed. Thus, the operation information related to the user's operation can more easily be displayed on the terminal device.

More preferably, the display unit includes a unit for making a transition of the operation screen image in accordance with an operation by the user; the transmission unit includes a unit, responsive to the transition of the operation screen image, for transmitting a display request for displaying the operation information corresponding to the operation screen image after the transition, to the terminal device; and the unit for controlling the display portion includes a unit for switching display of the display portion based on the display request transmitted from the unit for transmitting the display request to the terminal device. Thus, the operation information related to the user's operation can still more easily be displayed on the terminal device.

More preferably, the terminal device further includes a unit for transmitting terminal information including information as to whether it holds data of the operation manual or not, to the electronic device; and the electronic device includes a storage unit storing the data of the operation manual, a determining unit, responsive to reception of the terminal information, for determining whether the terminal device holds the data of the operation manual, based on the terminal information, and a unit, responsive to a determination by the determining unit that the terminal device does not hold the data of the operation manual, for transmitting data of the operation manual stored in the storage unit to the terminal device. When the terminal device does not have the data of operation manual, the electronic device transmits the data of operation manual to the terminal device. Therefore, even if the terminal device does not have the operation manual beforehand, it is possible to have the operation manual displayed on the terminal device.

More preferably, the terminal device further includes a unit, responsive to disconnection of wireless communication with the electronic device, for controlling the display portion such that display of the operation manual is turned off. The terminal device may be configured such that the data of operation manual is removed when wireless communication with the electronic device is disconnected.

According to a second aspect, the present invention provides an electronic device capable of communication with an external terminal device. The terminal device is capable of displaying an operation manual of the electronic device. The electronic device includes: a communication unit conducting wireless communication with the terminal device; a receiving unit for receiving an operation by a user; an establishing unit, detecting the terminal device, for establishing wireless communication with the detected terminal device through the communication unit; and a unit, responsive to establishment of wireless communication by the establishing unit, for transmitting a display request requesting display of operation information related to the operation received by the receiving unit of the operation manual through the communication unit to the terminal device.

Preferably, the establishing unit includes a unit for detecting, when the terminal device is waved over the electronic device, the terminal device and establishing wireless communication with the detected terminal device through the communication unit.

More preferably, the terminal device has a function of transmitting terminal information including information as to whether it holds data of the operation manual or not, to the electronic device; and the electronic device includes a storage unit storing the data of the operation manual, a determining unit, responsive to reception of the terminal information transmitted from the terminal device, for determining whether the terminal device holds the data of the operation manual, based on the terminal information, and a unit, responsive to a determination by the determining unit that the terminal device does not hold the data of the operation manual, for transmitting data of the operation manual stored in the storage unit to the terminal device.

As described above, by the present invention, a display system and an electronic device allowing operation of the device while viewing the operation manual without necessitating any troublesome operation can be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
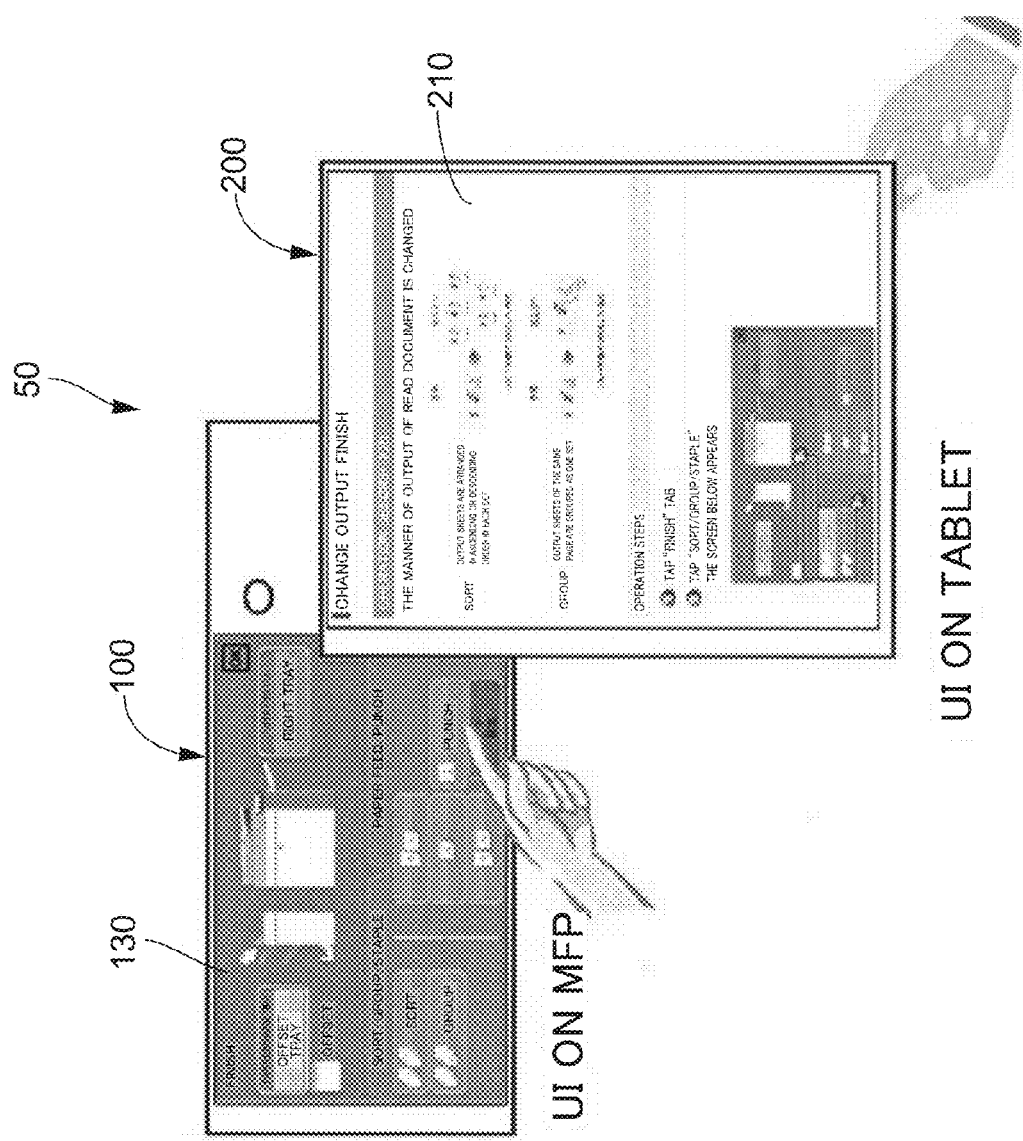
FIG. 1 schematically shows an overall configuration of the display system in accordance with a first embodiment of the present invention.

In the following embodiment, the same components are denoted by the same reference characters. Their functions and names are also the same. Therefore, detailed description thereof will not be repeated.

First Embodiment

[Overall System Configuration]

Referring to FIG. 1, the overall configuration of a display system 50 in accordance with the present embodiment will be described. Display system 50 includes an image forming apparatus 100 and a tablet terminal 200. Image forming apparatus 100 and tablet terminal 200 are capable of transmitting/receiving signals to and from each other by near field communication (NFC).

Image forming apparatus 100 is, for example, a digital multifunctional peripheral (MFP) having a copy function and a printer function. Image forming apparatus 100 has a so-called laser printing (electrophotography) function, utilizing laser light for exposure. The apparatus, however, may have a different type printing function.

Tablet terminal 200 is, for example, a tablet type portable terminal having a display screen of about 10 inches. Tablet terminal 200 has an NFC module (not shown) for near field communication with image forming apparatus 100. NFC is a technique for short distance wireless communication enabling data communication at a short distance of about a few to several tens centimeters. Since it has the NFC module mounted thereon, when one moves tablet terminal 200 close to and wave over a prescribed portion of image forming apparatus 100, bi-directional communication becomes possible between tablet terminal 200 and image forming apparatus 100.

In the present embodiment, when tablet terminal 200 is waved over image forming apparatus 100 while a user is operating image forming apparatus 100, an operation manual (operation manual related to the on-going operation) of image forming apparatus 100 is displayed on tablet terminal 200.

[Hardware Configuration]

<<Image Forming Apparatus>>

Figure 2:
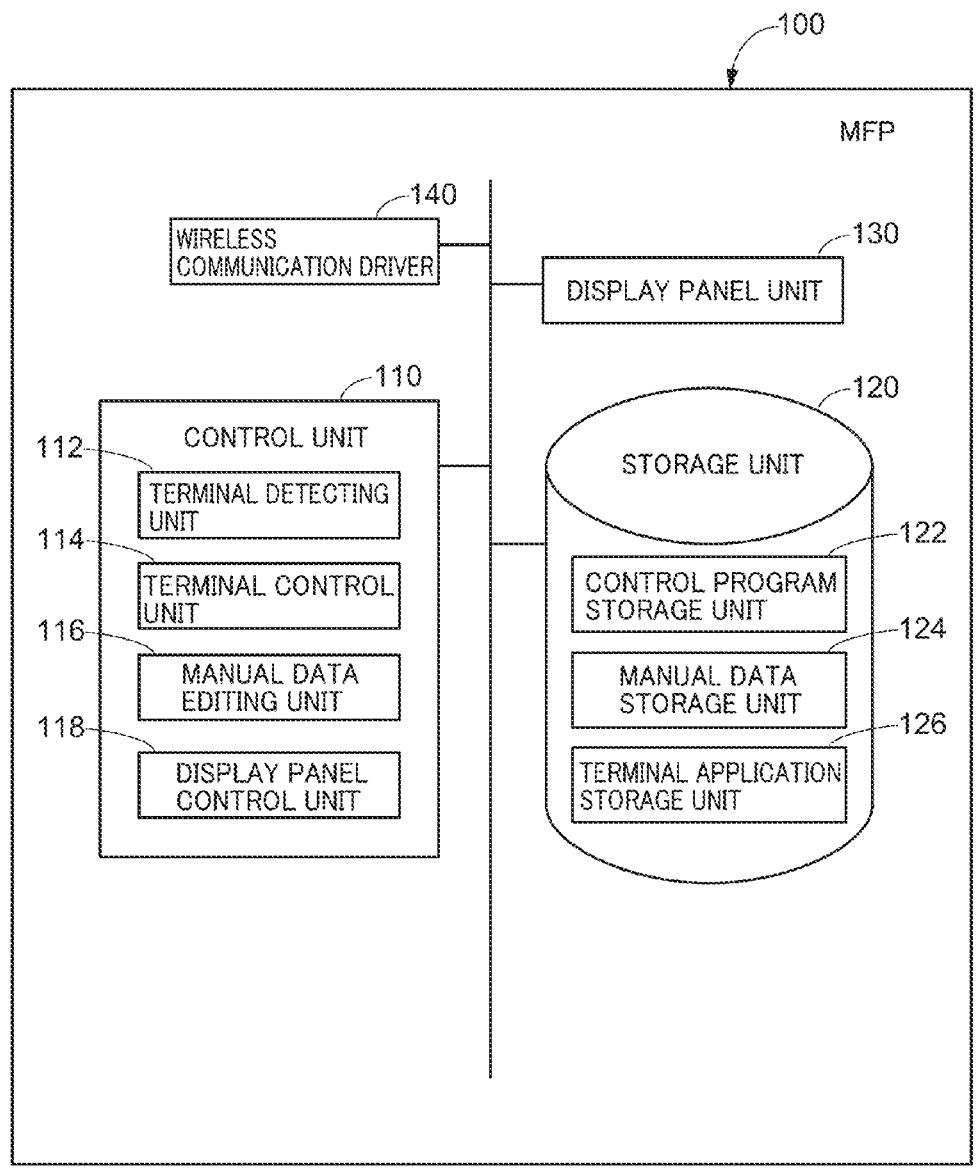
FIG. 2 is a control block diagram showing hardware configuration of the image forming apparatus shown in FIG. 1.

Referring to FIG. 2, image forming apparatus 100 includes a control unit 110, a storage unit 120, a display panel unit 130 and a wireless communication driver 140.

Control unit 110 is substantially a computer, and it includes a CPU (Central Processing Unit), an ROM (Read Only Memory), and an RAM (Random Access Memory), all not shown. The CPU executes various computer programs in accordance with instructions from display panel unit 130, tablet terminal 200 and the like, and thereby realizes operations of various portions and units of image forming apparatus 100 and executes desired processes such as communication with an external device such as tablet terminal 200. The various programs mentioned above are stored in the ROM or storage unit 120 in advance, and when a desired process is executed, read from the ROM or storage unit 120 and transferred to the RAM. The CPU reads and interprets a program instruction from an address in the RAM designated by a value stored in a register, called a program counter, not shown, in the CPU. Further, the CPU reads data necessary for computation from an address designated by the read instruction, and executes a computation corresponding to the instruction, on the data. The results of execution are also stored in an address designated by the instruction, in the RAM, storage unit 120 or the register in CPU.

Control unit 110 further includes a terminal detecting unit 112 executing a process for detecting wireless communication with tablet terminal 200, a terminal control unit 114 executing a process for transmitting a request (terminal information request) asking terminal information to the detected tablet terminal 200, a manual data editing unit 116 executing a process for editing manual data, as the electronic data of operation manual, and a display panel control unit 118 controlling display on display panel unit 130.

Storage unit 120 stores a computer program for realizing general operations of image forming apparatus 100. The computer program is provided, for example, from an information processing apparatus, through wireless communication driver 140. The computer program may be provided by a storage medium, such as a DVD, recording the computer program. Specifically, a DVD as a recording medium recording the computer program may be loaded to a DVD drive (not shown) built-in in image forming apparatus 100, and the computer program may be read from the DVD and installed in storage unit 120. Storage unit 120 further stores a computer program for executing a process for displaying the operation manual on tablet terminal 200, and various data including image data.

Storage unit 120 further includes a computer program storage unit 122 for storing the computer programs described above, a manual data storage unit 124 for storing the operation manual (manual data) of itself, and a terminal application storage unit 126 for storing a dedicated application (hereinafter referred to as "manual display application") for displaying the operation manual on tablet terminal 200.

Figure 3:
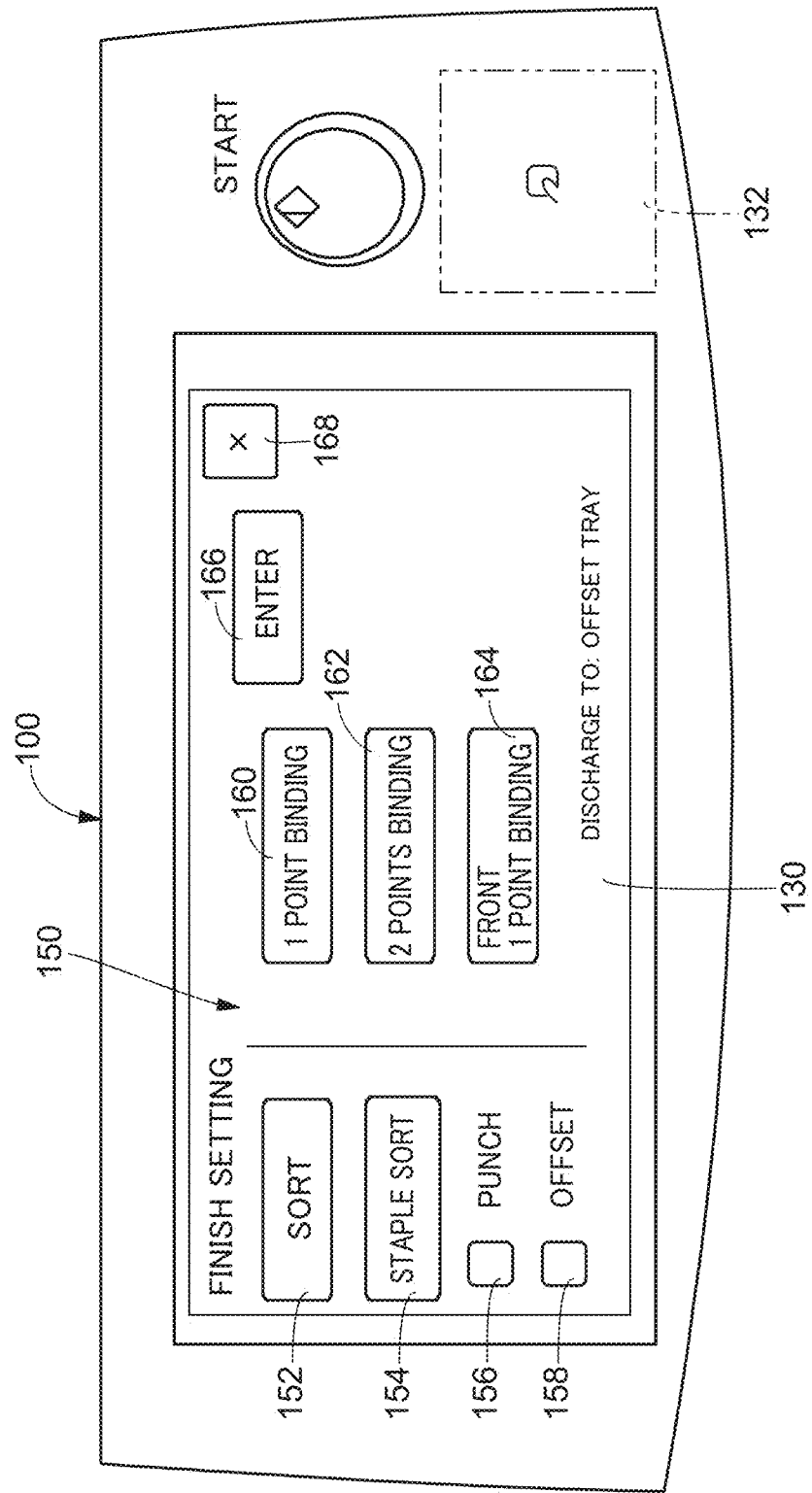
FIG. 3 shows a display panel unit of the image forming apparatus shown in FIG. 1.

Referring to FIGS. 2 and 3, display panel unit 130 is a touch-panel integrated type liquid crystal display device, formed by superposing a display and a touch-panel. Display panel unit 130 provides various pieces of information related to the state of image forming apparatus 100 and related to the state of various processes to the user. Further, the touch-panel display provides an interactive operation interface (user interface) to the user. The interactive operation interface receives a user instruction (operation) for the overall operation of image forming apparatus 100 through the touch-panel, displays the contents of instruction on the display, and outputs a control signal in accordance with the instruction to, for example, control unit 110. Specifically, on display panel unit 130, an operation screen image is displayed, and when the operation screen image is operated by the user, image forming apparatus 100 receives an instruction in accordance with the operation. The operation screen image displayed on display panel unit 130 may make a transition in response to a user operation. Display panel unit 130 further includes a wireless communication unit 132 over which tablet terminal 200 is waved, when near field communication is to take place with tablet terminal 200.

Referring to FIG. 2, wireless communication driver 140 has a functional unit realizing near field communication for wireless communication with tablet terminal 200. Image forming apparatus 100 is capable of data communication with tablet terminal 200 having the NFC module, in accordance with a communication protocol in compliance with NFC standard, through wireless communication driver 140. Wireless communication driver 140 may have a function to provide an interface to a network. Then, image forming apparatus 100 will be capable of data communication in accordance with a prescribed communication protocol with an information processing apparatus or the like on the network. By way of example, image forming apparatus 100 may receive instruction signals instructing execution of various processes including a print job from the information processing apparatus, through wireless communication driver 140.

Image forming apparatus 100 further stores, in storage unit 120, an association table (not shown) storing association between each of the operation screen images displayed on display panel unit 130 and pieces of information (manual position information (for example, page number of the operation manual)) representing the position where the operation information (manual) corresponding to each operation screen image is described. The association table is used when the manual corresponding to the operation screen image that is being displayed on display panel unit 130 is to be displayed on tablet terminal 200. When a plurality of operation manuals are provided, the association table should preferably store the types of operation manuals in association with the operation screen images.

Image forming apparatus 100 further includes functional units for image formation, such as an image reading unit (scanner unit), an image processing unit and an image forming unit. The structures of these functional units are the same as those of a conventional image forming apparatus (MFP) and, therefore, description thereof will not be given here.

<<Tablet Terminal 200>>

Figure 4:
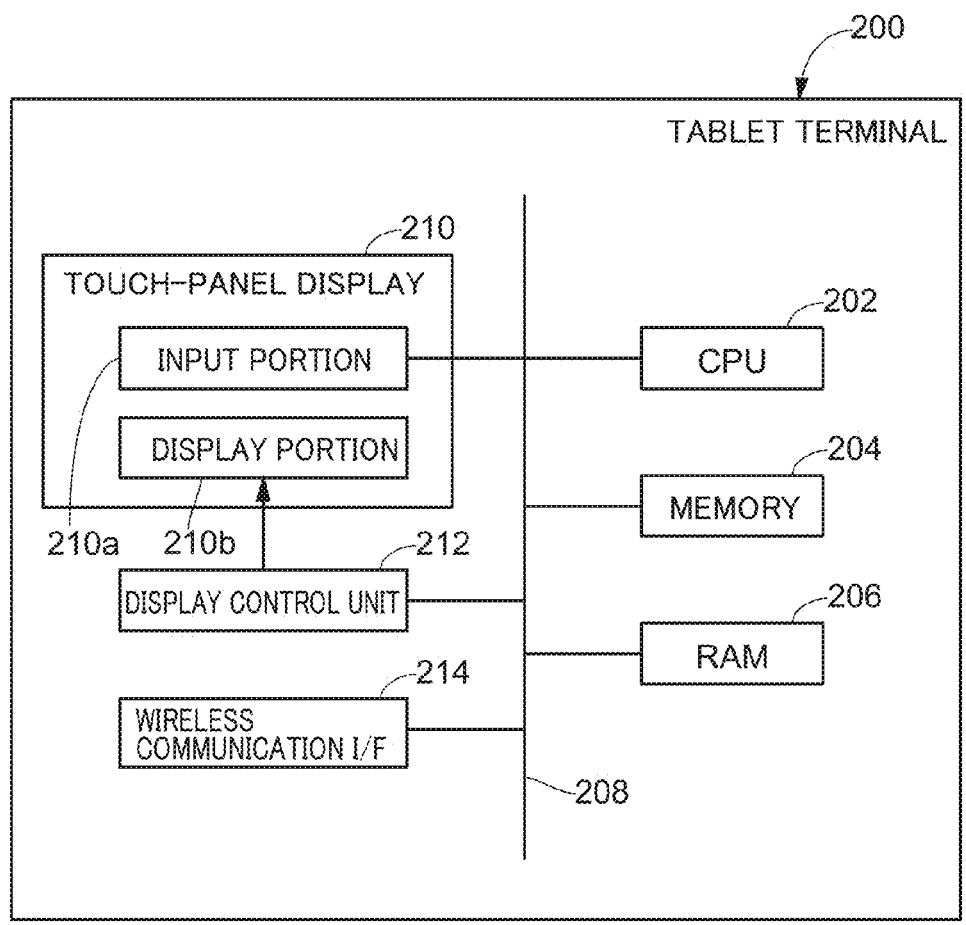
FIG. 4 is a control block diagram showing hardware configuration of the tablet terminal shown in FIG. 1.

Referring to FIG. 4, tablet terminal 200 forming display system 50 includes a CPU 202, a memory 204, an RAM 206 and a bus 208. CPU 202 is for overall control of tablet terminal 200. Memory 204 is an electrically rewritable non-volatile storage device, such as a flash memory. Memory 204 stores programs and data necessary for controlling the operation of tablet terminal 200.

CPU 202, memory 204 and RAM 206 are connected to bus 208. Exchange of data (including control information) between each of these units is done through bus 208. CPU 202 reads a program from memory 204 through bus 208 to RAM 206, and executes the program using a part of RAM 206 as a work area. Specifically, CPU 202 controls various units forming tablet terminal 200 in accordance with the program stored in memory 204, to realize each of the functions of tablet terminal 200. The computer program may be provided by a storage medium such as a DVD recording the computer program. Further, the computer program may be provided from an information processing apparatus or the like on a network through the network.

Tablet terminal 200 further includes a touch-panel display 210, a display control unit 212 and a wireless communication interface (hereinafter referred to as "wireless communication I/F") 214, all connected to bus 208.

Touch-panel display 210 includes an input portion 210a implemented by a touch-panel, and a display portion 210b implemented by a display panel. Display portion 210b is, for example, a liquid crystal display panel. Display control unit 212 includes a driving unit for driving display portion 210b, and generates and outputs to display portion 210b a signal for reading image data stored in RAM 206 at a prescribed timing and displaying the image data as an image on display portion 210b. The image data to be displayed is read by CPU 202 from memory 204 and transferred to RAM 206.

Wireless communication I/F 214 provides an interface with the network by radio wave. Wireless communication I/F 214 includes an NFC module for near field communication with image forming apparatus 100. Tablet terminal 200 is capable of near field communication with image forming apparatus 100 through wireless communication I/F 214.

[Software Configuration]

The process for displaying the operation manual of image forming apparatus 100 on tablet terminal in display system 50 in accordance with the present embodiment will be described.

Figure 5:
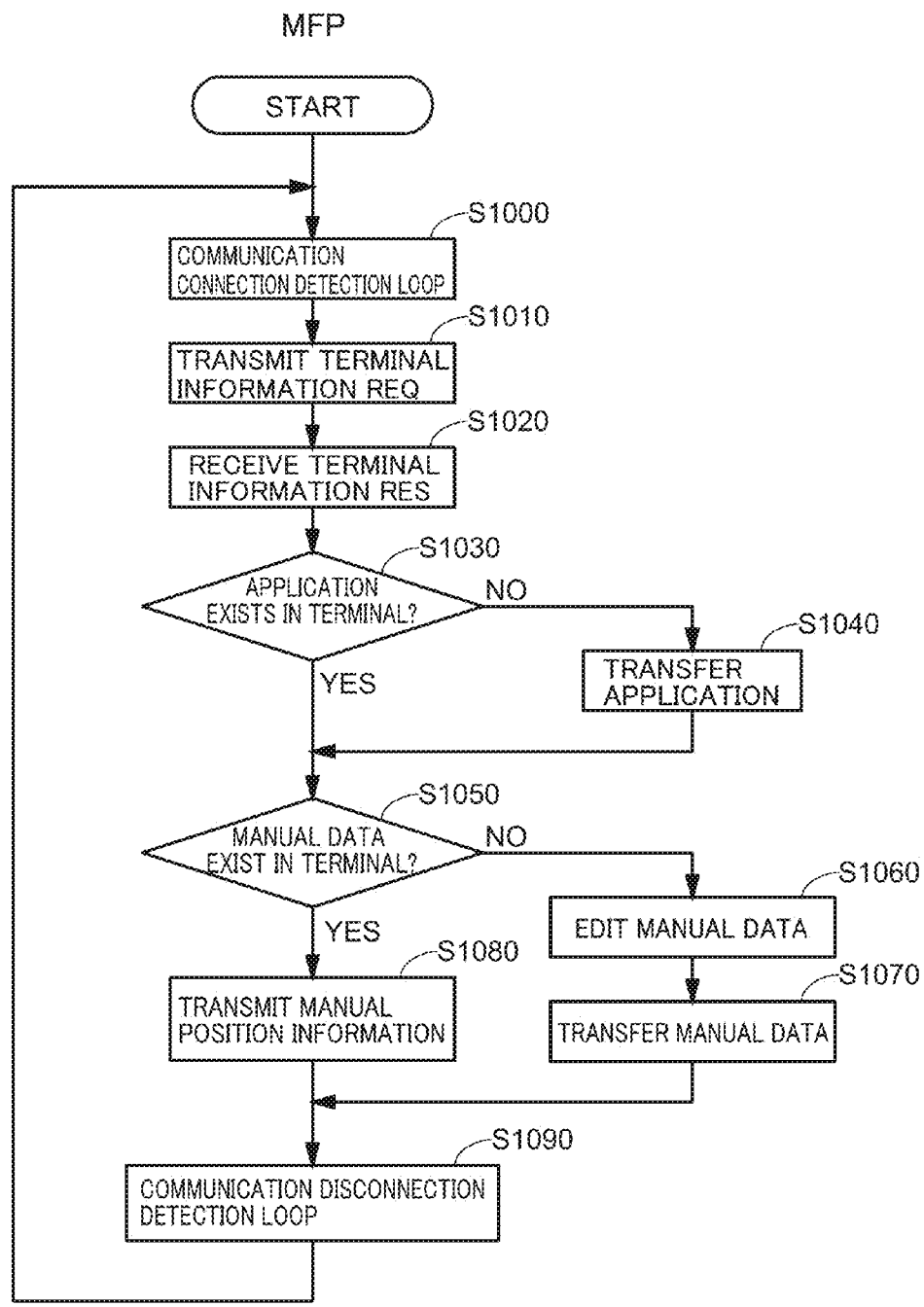
FIG. 5 is a flowchart representing a control structure of a program executed by the image forming apparatus shown in FIG. 1.

Referring to FIG. 5, the control structure of a computer program executed by image forming apparatus 100 to have the operation manual displayed on tablet terminal 200 will be described. The program is activated when image forming apparatus 100 is powered on.

The program includes: a step S1000 of executing polling for detecting a communicable tablet terminal; and a step S1010, executed following step S1000, of transmitting a request for terminal information of tablet terminal 200, to the detected tablet terminal. Assume, for example, that tablet terminal 200 is detected as a communicable tablet at step S1000. The terminal information asked at step S1010 includes information as to whether the detected tablet terminal 200 has a manual display application (whether or not a manual display application is installed), information as to whether the tablet holds (stores) manual data, and information related to the size of display screen of tablet terminal 200.

The program further includes: a step S1020, executed following step S1010, of receiving terminal information transmitted from tablet terminal 200 in response to the request of terminal information; a step S1030, executed after step S1020, of determining whether or not the manual display application is installed in tablet terminal 200 based on the received terminal information, and branching the control flow in accordance with the result of determination; a step S1040, executed if it is determined at step S1030 that the manual display application is not installed in tablet terminal 200, of transferring (transmitting) the manual display application stored in terminal application storage unit 126 to tablet terminal 200; and a step S1050, executed when it is determined at step S1030 that the manual display application is installed in tablet terminal 200 and after step S1040, of determining whether or not tablet terminal 200 holds the manual data, based on the received terminal information, and branching the flow of control depending on the result of determination.

The program further includes: a step S1060, executed when it is determined at step S1050 that tablet terminal 200 does not hold the manual data, of reading an operation manual (manual data) from manual data storage unit 124 in accordance with the contents of operation (operation information (manual) corresponding to the operation screen image displayed on display panel unit 130) of image forming apparatus 100, and editing the read operation manual (manual data) in accordance with the size of display screen of tablet terminal 200; and a step S1070, executed following step S1060, of transferring the edited manual data to tablet terminal 200. At step S1060, the manual data is compressed as needed. By way of example, if the size of display screen of tablet terminal 200 is small, the amount of communication at the time of data transfer can be reduced by compressing the manual data.

The program further includes: a step S1080, executed if it is determined at step S1050 that tablet terminal 200 holds the manual data, of using the association table to look up and transfer information of the position where the operation information (manual) corresponding to the operation screen image displayed on display panel unit 130 is described (manual information (for example, page number)), to tablet terminal 200; and a step S1090, executed after steps S1070 and S1080, of executing a process of detecting disconnection of communication. When the process of step S1090 ends, that is, when disconnection of communication is detected, the control returns to step S1000.

Figure 6:
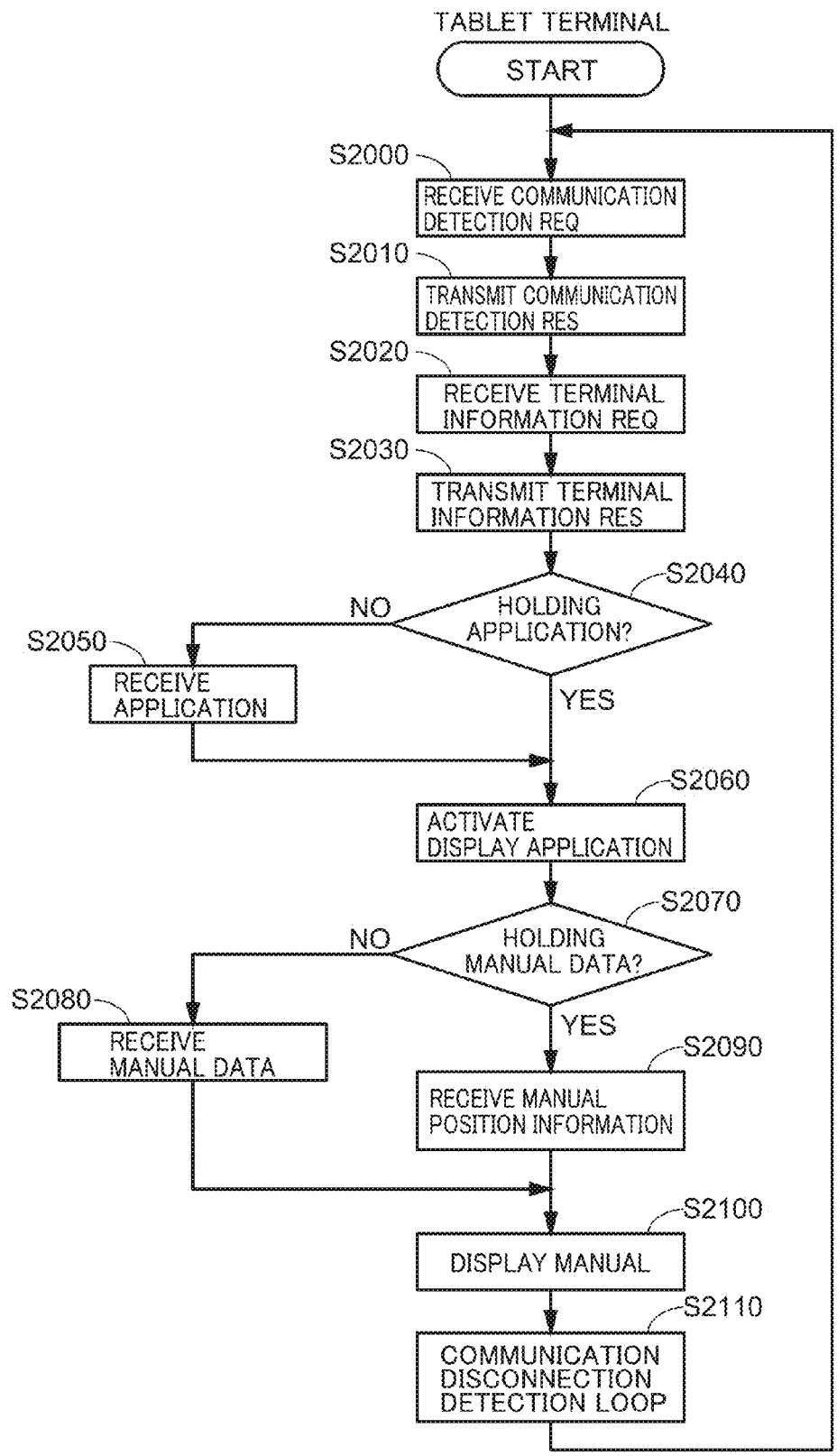
FIG. 6 is a flowchart representing a control structure of a program executed by the tablet terminal shown in FIG. 1.

Referring to FIG. 6, the control structure of a computer program executed by tablet terminal 200 for displaying the operation manual will be described. The program is activated when tablet terminal 200 is powered on. In the following, it is assumed that while image forming apparatus 100 is being operated, the user waves tablet terminal 200 over wireless communication unit 132 (see FIG. 3) of image forming apparatus 100.

The program includes: a step 2000 of receiving a communication detection request (polling request) from image forming apparatus 100; a step S2010, executed following step S2000, of transmitting a response to image forming apparatus 100; a step S2020, executed following step S2010, of receiving a request (request asking terminal information) transmitted from image forming apparatus 100; and a step S2030, executed following step S2020, of transmitting the terminal information of its own to image forming apparatus 100.

The program further includes: a step S2040, executed following step S2030, of determining whether the terminal holds a manual display application (whether or not it has a manual display application installed in itself), and branching the flow of control depending on the result of determination; a step S2050, executed if it is determined at step S2040 that the manual display application is not held, of receiving a manual display application transferred from image forming apparatus 100; and a step S2060, executed if it is determined at step S2040 that a manual display application is held and after step S2050, of activating the manual display application.

The program further includes; a step S2070, executed following step S2060, of determining whether or not the manual data is held (stored), and branching the flow of control depending on the result of determination; a step S2080, executed if it is determined at step S2070 that the manual data is not held, of receiving manual data transmitted from image forming apparatus 100; and a step S2090, executed if it is determined at step S2070 that the manual data is held, of receiving the manual position information transmitted from image forming apparatus 100.

The program further includes: a step S2100, executed after steps S2080 and S2090, of displaying the operation manual using the manual display application; and a step S2110, executed following step S2010, of executing a process of detecting disconnection of communication. When the process of step S2110 ends, that is, when disconnection of communication is detected, the control returns to step S2000.

[Operation]

Display system 50 in accordance with the present embodiment operates in the following manner.

Image forming apparatus 100 is capable of near field communication with a terminal having an NFC module mounted thereon. Terminal detecting unit 112 of image forming apparatus 100 executes polling for detecting a communicable terminal (tablet terminal) through wireless communication driver 140 (step S1000 shown in FIG. 5). Assume that tablet terminal 200 is waved over wireless communication unit 132 (see FIG. 3) of image forming apparatus 100 while image forming apparatus 100 is in operation. Since tablet terminal 200 is in the vicinity of image forming apparatus 100, it can receive the polling request from image forming apparatus 100. Receiving the polling request (step S2000 shown in FIG. 6), tablet terminal 200 transmits a response to image forming apparatus 100 (step S2010). Receiving the response from tablet terminal 200, image forming apparatus 100 establishes wireless communication with tablet terminal 200. Thus, bi-directional communication becomes possible between tablet terminal 200 and image forming apparatus 100.

When image forming apparatus 100 receives a response of polling (response transmitted from tablet terminal 200) through wireless communication driver 140, terminal control unit 114 transmits request for terminal information to detected tablet terminal 200 (step S1010 shown in FIG. 5). Receiving the request from image forming apparatus 100 (step S2020 shown in FIG. 6), tablet terminal 200 transmits the terminal information of itself to image forming apparatus 100 (step S2030).

Receiving the terminal information from tablet terminal 200 (step S1020 shown in FIG. 5), image forming apparatus 100 determines, based on the terminal information, whether or not a manual display application is installed in tablet terminal 200 (step S1030) and whether tablet terminal 200 holds the manual data (step S1050). Further, image forming apparatus 100 recognizes the size of display screen of tablet terminal 200 based on the terminal information.

If no manual display application is installed in tablet terminal 200 (NO at step S1030), image forming apparatus 100 retrieves a manual display application from terminal application storage unit 126 and transfers the application to tablet terminal 200 (step S1040).

If tablet terminal 200 does not have the manual data (NO at step S1050), image forming apparatus 100 references the association table, retrieves the manual data corresponding to the contents of operation being done on image forming apparatus 100 from manual data storage unit 124, and transfers it to tablet terminal 200 (steps S1060 and S1070). By transferring the manual data, image forming apparatus 100 requests tablet terminal 200 to display the operation manual. At this time, manual data editing unit 116 edits the manual data read from manual data storage unit 124 if it is necessary from the size of display screen of tablet terminal 200. By way of example, when the size of display screen of tablet terminal 200 is smaller than a prescribed size, manual data editing unit 116 executes the process of compressing the manual data. Thus, the amount of communication at the time of transfer can be reduced. On the other hand, if tablet terminal 200 has the manual data, image forming apparatus 100 transmits only the information of position (manual position information (for example, page number)) where the operation information (manual) corresponding to the operation screen image being displayed on display panel unit 130 is described to tablet terminal 200. By transmitting the manual position information, image forming apparatus 100 requests tablet terminal 200 to display the operation manual.

When the manual display application is installed in itself (YES at step S2040), tablet terminal 200 activates the manual display application (step S2060). On the other hand, if the manual display application is not installed in itself (NO at step S2040), tablet terminal 200 receives the manual display application from image forming apparatus 100 (step S2050), and activates the received application (S2060).

If tablet terminal 200 already holds the manual data of operation manual of image forming apparatus 100 (YES at step S2070), tablet terminal 200 receives the manual position information from image forming apparatus (step S2090), and displays the operation information (manual) indicated by the manual position information by manual display application (step S2100). On tablet terminal 200, the manual (operation information) corresponding to the operation screen image displayed on display panel unit 130 of image forming apparatus 100 is displayed.

On the other hand, if tablet terminal 200 does not hold the manual data of operation manual (NO at step S2070), tablet terminal 200 receives the manual data from image forming apparatus 100 (step S2080), and displays the manual data by the manual display application (step S2100). Here again, on tablet terminal 200, the manual (operation information) corresponding to the operation screen image displayed on display panel unit 130 of image forming apparatus 100 is displayed.

Referring to FIG. 3, assume that on display panel unit 130 of image forming apparatus 100, operation screen image 150 for setting, for example, finishing process, is displayed. The operation screen image 150 includes various buttons for finish settings. Specifically, operation screen image 150 includes a "SORT" button 152 for sorting, a "STAPLE SORT" button 154 for stapling and sorting, a check box 156 checked to set punching, and a check box 158 checked to set offset. Operation screen image 150 further includes buttons 160 to 164 for setting positions of stapling when "STAPLE SORT" button 154 is operated (when stapling and sorting is set), an "ENTER" button 166 for entering the setting, and a button 168 for closing the finish setting screen image (operation screen image 150). Button 160 is for setting deep one point binding, button 162 is for setting two-point binding, and button 164 is for setting front one point binding.

Figure 7:
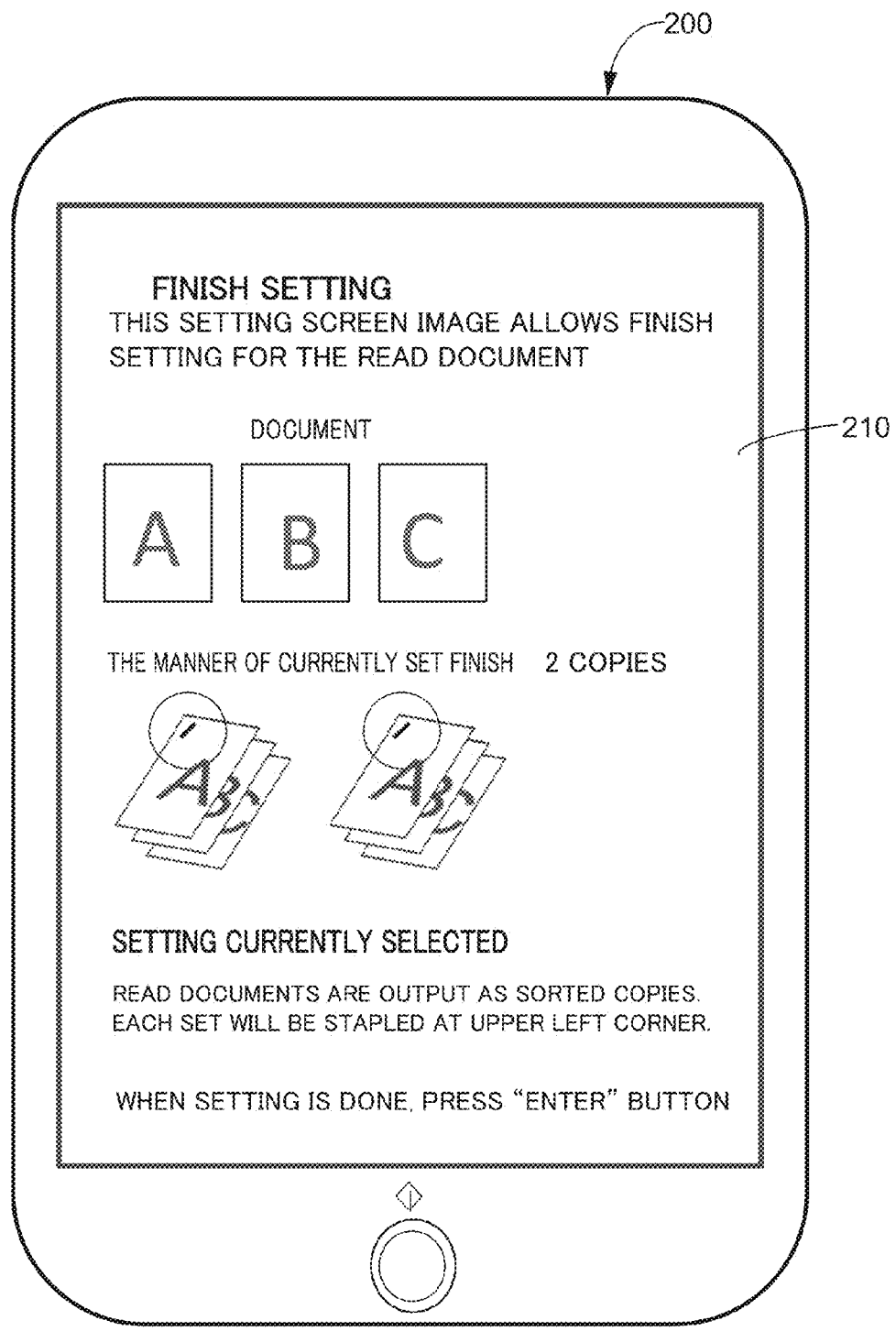
FIG. 7 shows an example of a display screen image displayed on the tablet terminal shown in FIG. 1.

When tablet terminal 200 is waved over wireless communication unit 132 of image forming apparatus 100 while operation screen image 150 is being operated, image forming apparatus 100 and tablet terminal 200 communicate with each other. Referring to FIG. 7, on touch-panel display 210 of tablet terminal 200, a manual (operation information) corresponding to operation screen image 150 is displayed.

When terminal detecting unit 112 of image forming apparatus 100 detects disconnection of communication with tablet terminal 200 through wireless communication driver 140 (step S1090 shown in FIG. 5), it resumes a state (step S1000) for detecting communication connection again. By way of example, if tablet terminal 200 is moved and the distance between tablet terminal 200 and image forming apparatus 100 becomes longer and exceeds the communication range, communication is disconnected.

Effects of the Present Embodiment

As is apparent from the description above, by using display system 50 in accordance with the present embodiment, the following effects can be attained.

Image forming apparatus 100 detects tablet terminal 200 and establishes wireless communication with the detected tablet terminal 200. When wireless communication is established, image forming apparatus 100 transmits a request for displaying the operation information (manual) related to the currently on-going operation to tablet terminal 200. Receiving the display request transmitted from image forming apparatus 100, tablet terminal 200 displays the requested operation information (manual) of the operation manual.

In this manner, in the present display system 50, when image forming apparatus 100 detects tablet terminal 200 and establishes wireless communication, it causes tablet terminal 200, with which the wireless communication is established, to display the operation manual. Since the operation manual is displayed on tablet terminal 200 when wireless communication is established, no troublesome operation is necessary to display the operation manual on tablet terminal 200. Since the operation manual of image forming apparatus 100 is displayed on tablet terminal 200 as an external device, it is possible to operate image forming apparatus 100 while viewing the operation manual. Further, since the operation information (manual) related to the currently on-going operation is displayed on tablet terminal 200, it is unnecessary to search for a desired piece of information from descriptions of many functions. Therefore, time and effort to find the target manual (operation information) can be saved.

Second Embodiment

A display system in accordance with the present embodiment has the same configuration as display system 50 in accordance with the first embodiment except that the tablet terminal has a security setting function. When disconnection of communication with the image forming apparatus is detected, the tablet terminal stops display of the manual that has been displayed, in accordance with security setting.

The tablet terminal may be configured to stop display of the manual until communication with the image forming apparatus is again detected, or it may be configured such that the manual data is deleted when disconnection of communication with the image forming apparatus is detected.

Such configurations are effective when the operation manual of the image forming apparatus is for internal use only and not to be taken out.

(Modifications)

In the embodiment above, an example in which the present invention is applied to an image forming apparatus as an exemplary electronic device has been described. The present invention, however, is not limited to such an embodiment. The electronic device forming the display system may be a device other than the image forming apparatus. Further, though an example has been described in which the present invention is applied to a multifunctional peripheral as an exemplary electronic device, the image forming apparatus may be other than the multifunctional peripheral. By way of example, it may be an image forming apparatus such as a printer or a copy machine.

Though an example has been described in which the present invention is applied to a tablet terminal as an example of terminal device in the embodiment above, the present invention is not limited to such an embodiment. The terminal device forming the display system may be a device other than the tablet terminal.

Though an example has been described in which wireless communication between the image forming apparatus and the tablet terminal is realized by near field communication (NFC) in the embodiment above, the present invention is not limited to such an embodiment. The wireless communication between the image forming apparatus and the tablet terminal may be other than near field communication. By way of example, it may be realized by short-distance wireless communication such as Bluetooth (registered trademark), or by wireless LAN.

Further, the image forming apparatus and the tablet terminal may each be configured to have a number of different types of wireless communication functions. By way of example, the image forming apparatus and the tablet terminal may each be configured to have the wireless communication functions of NFC and Bluetooth. In that case, it is preferable that communication procedure (pairing) of Bluetooth can be executed through wireless communication by NFC. By such an approach, even when wireless communication by NFC is disconnected, wireless communication between the devices is possible by Bluetooth. Though it is necessary to keep the tablet terminal close to the image forming apparatus when wireless communication is realized by NFC, Bluetooth has relatively long communication distance and, therefore, connection for communication can be maintained even when the tablet terminal is to some extent away from the image forming apparatus, if wireless communication is realized by Bluetooth.

When the image forming apparatus and the tablet terminal have a plurality of different types of wireless communication functions, a large amount of data such as manual data or application may be transmitted using wireless communication having higher speed of communication. By way of example, Bluetooth has higher speed of communication than NFC. Therefore, when pairing of Bluetooth is executed by wireless communication using NFC, data of large capacity may be transmitted by wireless communication using Bluetooth.

In the embodiment above, it is possible to continuously operate the image forming apparatus even while the operation manual is displayed on the tablet terminal. When the user operates the operation screen image displayed on the display panel unit, the image forming apparatus receives an instruction corresponding to the operation. In that case, the operation screen image may make a transition in response to the user operation. It is desirable that the image forming apparatus is configured to transmit manual position information corresponding to the operation screen image as changed by the transition to the tablet terminal. By such an approach, it becomes possible, when the operation screen image makes a transition, to have the operation information (manual) corresponding to the operation screen image as changed after transition, on the tablet terminal. Specifically, as the operation screen image makes a transition, the manual displayed on the tablet terminal can be switched to the manual corresponding to the operation screen image after transition.

In the embodiment above, when the data rate of wireless communication is not high, the image forming apparatus may transmit the manual data to the tablet terminal after processing the data, for example, after compressing the data.

Though an example in which the manual corresponding to the operation screen image of the image forming apparatus is displayed on the tablet terminal has been described in the embodiment above, the present invention is not limited to such an embodiment. It has only to be configured such that while the user is operating the image forming apparatus, the manual related to the currently on-going operation is displayed on the tablet terminal. By way of example, if an operation key (for example, a hard key) outside of the operation screen image is operated and the information of key operation is not displayed on the operation screen image, operation information related to the key operation may be displayed on the tablet.

Figure 8:
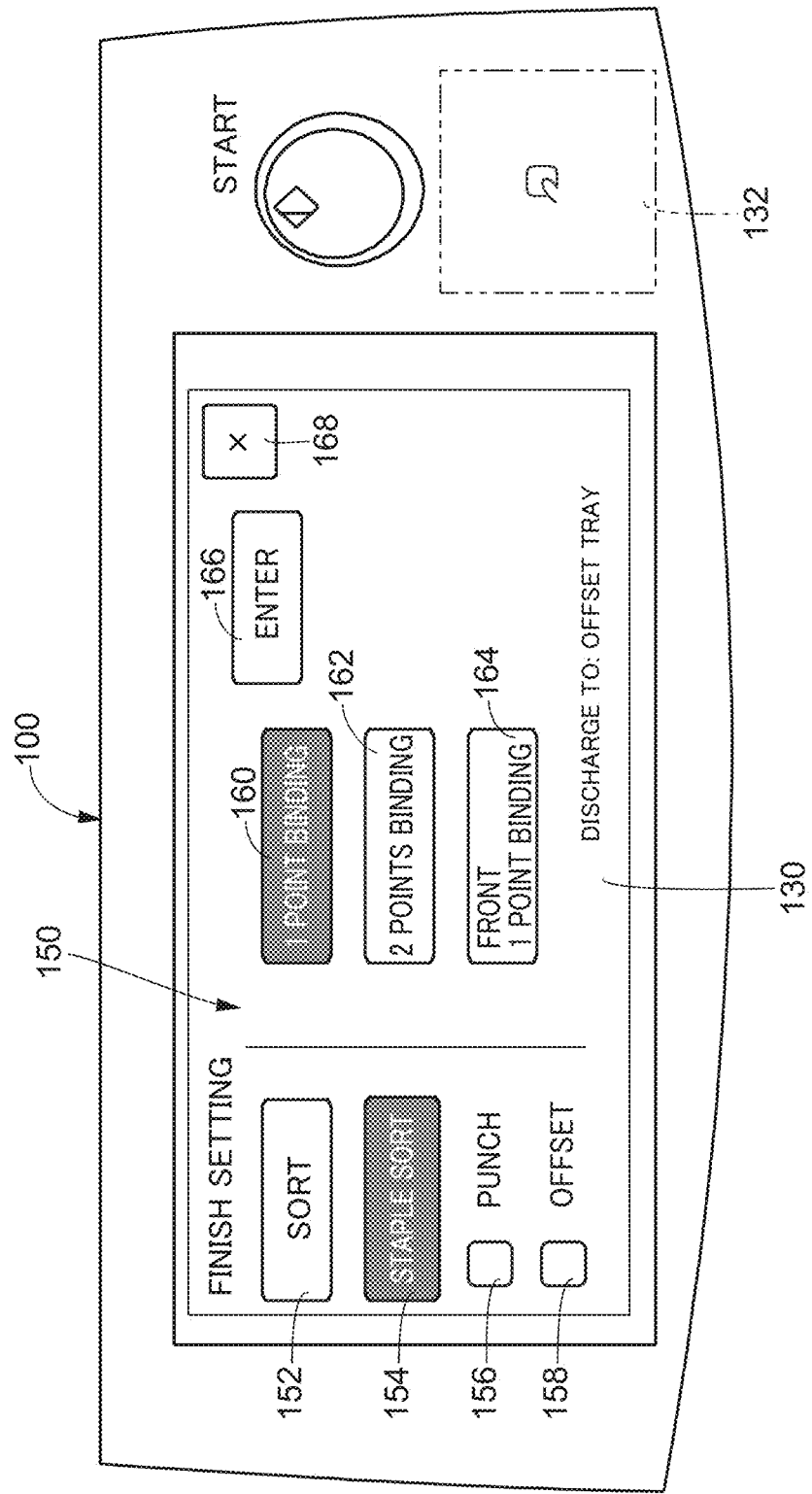
FIG. 8 shows a display panel unit of the image forming apparatus.
Figure 9:
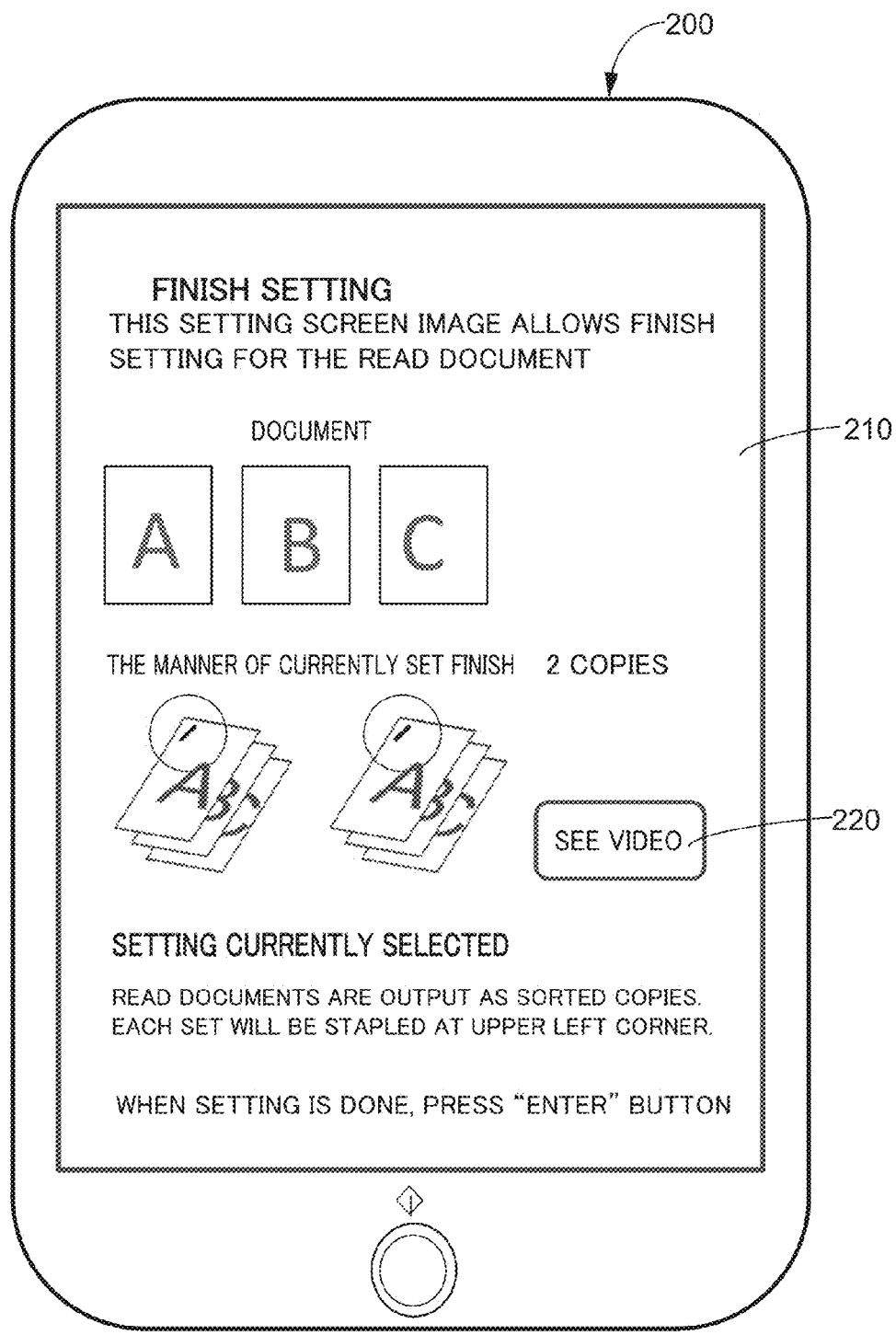
FIG. 9 shows another example of the display screen image displayed on the tablet terminal.

Further, when a tablet terminal is waved over the wireless communication unit of image forming apparatus while a desired button on the operation screen image is being selected, the manual (operation information) related to the selected button may be displayed on the tablet. Referring to FIG. 8, by way of example, on operation screen image 150, assume that "STAPLE SORT" button 154 and a button 160 for setting deep one point binding are selected. When the tablet terminal is waved over the wireless communication unit of image forming apparatus in this situation, the manual related to the buttons that are being selected in relation to the finish settings may be displayed on the touch-panel display of tablet terminal. Since the tablet terminal advantageously has a large size and high resolution, it is possible to easily confirm the finished state resulting from the settings.

The operation manual displayed on the tablet terminal may or may not have the same configuration as the operation manual displayed on the display panel unit of the image forming apparatus. The operation manual of a different configuration may include one having larger amount of information than that displayed on the display panel unit of image forming apparatus. Further, the operation manual displayed on the tablet terminal may be a movie. Specifically, the operation manual may be presented as video display. In that case, by way of example, a button 220 (such as "SEE VIDEO") may be arranged for playing video in the operation manual of still image and the video reproduction may be started when button 220 is pressed.

The data format of manual data for the operation manual is not specifically limited. By way of example, the format of manual data may be PDF or HTML or other format.

Though an example in which the manual is displayed on the tablet terminal using a dedicated application (manual display application) has been described in the embodiment above, the present invention is not limited to such an embodiment. The tablet terminal may be configured to display the operation manual using, for example, a general browser.

Though an example in which a security process such as stopping display of manual data by providing a security function on the tablet terminal has been described in the second embodiment above, the present invention is not limited to such an embodiment. The security process is not limited to the one executed on the side of tablet terminal after the communication between the image forming apparatus and the tablet terminal is disconnected, and it may be realized by an instruction from the image forming apparatus to the tablet terminal. For instance, after the image forming apparatus is connected to the tablet terminal by NFC as described above, the image forming apparatus can establish wireless communication with the tablet terminal using a different communication standard (for example, Bluetooth). Here, even when the wireless communication by NFC is lost as the distance between the image forming apparatus and the tablet terminal increases, it is possible to instruct deletion of manual data, for example, from the image forming apparatus to the tablet terminal if the wireless communication by another communication standard is maintained.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A display system, including an electronic device and a terminal device transmitting/receiving information to/from said electronic device through wireless communication, wherein a plurality of operations are available for said electronic device, said electronic device includes an electronically readable operation manual, said operation manual includes pieces of operation information each describing procedures of corresponding operation instructions of said electronic device, and said pieces of operation information are specified by a position in said operation manual; and said electronic device includes:

a communicator configured or programmed to conduct wireless communication with said terminal device;

a receiver configured or programmed to receive an operation by a user, said receiver including a receiver display configured to display a plurality of operation screen images and transition between the plurality of operation screen images;

an association storage configured or programmed to store associations between said plurality of operations and pieces of position information specifying positions of corresponding pieces of operation information in said operation manual;

a communications controller configured or programmed to detect said terminal device and to establish wireless communication with said detected terminal device through said communicator; and
a transmitter configured or programmed to, responsive to establishment of wireless communication by said communications controller, read the position information of an operation corresponding to each of the plurality of operation screen images as each of the plurality of operation screen images is displayed on said receiver display, from said association storage, said transmitter being further configured or programmed to transmit the position information read from said association storage and a display request through said communicator to said terminal device, said display request requesting said terminal device to display the operation information from the operation manual at the position specified by said position information; and
said terminal device includes:
a display configured to display said operation manual;
a wireless communicator configured or programmed to conduct wireless communication with said electronic device; and
a display controller configured or programmed to, responsive to reception of said display request transmitted from said electronic device through said wireless communicator, control said display of said terminal device based on said position information such that the requested operation information of said operation manual is displayed on said display of said terminal device as each of the plurality of operation screen images is displayed on said receiver display.

2. The display system according to claim 1, wherein said communications controller includes a detector which is configured or programmed to detect, when said terminal device is waved over said electronic device, said terminal device and to establish wireless communication with said detected terminal device through said communicator.

3. The display system according to claim 1, wherein
said display controller includes an information display controller configured or programmed to control said display of said terminal device such that operation information of said operation manual corresponding to the operation screen images displayed on said receiver display is displayed on said display of said terminal device.

4. The display system according to claim 3, wherein
said receiver display includes a transition operator configured or programmed to make the transition between the operation screen images in accordance with an operation by the user;
said transmitter includes a request transmitter configured or programmed to, responsive to the transition between the operation screen images, transmit a display request for displaying the operation information corresponding to the operation screen images after the transition, to said terminal device; and
said information display controller includes a display switch configured or programmed to switch a display of said display of said terminal device based on the display request transmitted from said request transmitter.

5. The display system according to claim 1, wherein
said terminal device further includes a terminal information transmitter configured or programmed to transmit terminal information including information as to whether said terminal device holds data of said operation manual or not, to said electronic device; and said electronic device includes:
an operation manual storage configured to store the data of said operation manual;
a determination controller configured or programmed to, responsive to reception of said terminal information, determine whether said terminal device holds the data of said operation manual, based on the terminal information; and
a manual data transmitter configured or programmed to, responsive to a determination by said determination controller that said terminal device does not hold the data of said operation manual, transmit data of said operation manual stored in said operation manual storage to said terminal device.

6. The display system according to claim 1, wherein said terminal device further includes an additional display controller configured or programmed to, responsive to disconnection of wireless communication with said electronic device, control said display of said terminal device such that display of said operation manual is turned off.

7. An electronic device capable of communication with an external terminal device, wherein
a plurality of operations are available for said electronic device, said electronic device includes an electronically readable operation manual, said operation manual includes pieces of operation information each describing procedures of corresponding operation instructions of said electronic device, and said pieces of operation information are specified by a position in said operation manual; and
said terminal device is configured or programmed to display the operation manual of said electronic device; and
said electronic device includes:
a communicator configured or programmed to conduct wireless communication with said terminal device;
a receiver configured or programmed to receive an operation by a user, said receiver including a receiver display configured to display a plurality of operation screen images and transition between the plurality of operation screen images;
an association storage configured or programmed to store associations between said plurality of operations and pieces of position information specifying positions of corresponding pieces of operation information in said operation manual;
a communications controller configured or programmed to detect said terminal device, and to establish wireless communication with said detected terminal device through said communicator; and
a transmitter responsive to establishment of wireless communication by said communications controller, said transmitter being configured or programmed to read the position information of an operation corresponding to each of the plurality of operation screen images as each of the plurality of operation screen images is displayed on said receiver display, from said association storage, and to transmit the position information read from the association storage and a display request through the communicator to said terminal device, said display request requesting said terminal device to display the operation information from the operation manual at the position specified by said position information on said display of said terminal device as each of the plurality of operation screen images is displayed on said receiver display.

8. The electronic device according to claim 7, wherein said communications controller includes a detector which is configured or programmed to detect, when said terminal device is waved over said electronic device, said terminal device and to establish wireless communication with said detected terminal device through said communicator.

9. The electronic device according to claim 7, wherein
said terminal device is configured or programmed to transmit terminal information including information as to whether it holds data of said operation manual or not, to said electronic device; and said electronic device includes:

an operation manual storage configured to store the data of said operation manual;

a determination controller configured or programmed to, responsive to reception of said terminal information transmitted from said terminal device, determine whether said terminal device holds the data of said operation manual, based on the terminal information; and a manual data transmitter configured or programmed to, responsive to a determination by said determination controller that said terminal device does not hold the data of said operation manual, transmit data of said operation manual stored in said operation manual storage to said terminal device.

10. The display system according to claim 1, wherein said plurality of operations correspond to at least a copy function and a stapling function.

11. The electronic device according to claim 7, wherein said plurality of operations correspond to at least a copy function and a stapling function.

* * * * *